United States Patent [19]

Jacobsen et al.

[11] Patent Number: 4,789,803

[45] Date of Patent: Dec. 6, 1988

[54] MICROPOSITIONER SYSTEMS AND METHODS

[75] Inventors: Stephen C. Jacobsen; John E. Wood; Richard H. Price, all of Salt Lake City, Utah

[73] Assignee: Sarcos, Inc., Salt Lake City, Utah

[21] Appl. No.: 81,822

[22] Filed: Aug. 4, 1987

[51] Int. Cl.[4] .............................................. H02N 1/00
[52] U.S. Cl. ................... 310/309; 310/300; 310/90.5; 156/DIG. 62; 307/400
[58] Field of Search .................. 310/1, 300, 309, 328, 310/12-14, 15, 36, 90.5; 307/400; 156/DIG. 62

[56] References Cited

U.S. PATENT DOCUMENTS

| | | | |
|---|---|---|---|
| 1,974,483 | 9/1934 | Brown | 310/309 X |
| 2,377,175 | 5/1945 | Peer | 310/90.5 X |
| 2,790,942 | 4/1957 | Elbinger | 310/309 X |
| 3,221,563 | 12/1965 | Wing | 310/90.5 X |
| 3,338,644 | 8/1967 | Atkinson et al. | 310/90.5 |
| 3,370,205 | 2/1968 | Dukes et al. | 310/90.5 X |
| 3,512,852 | 5/1970 | North | 310/90.5 X |
| 3,815,000 | 6/1974 | Phillips | 310/90.5 |
| 3,954,024 | 5/1976 | Staas | 310/90.5 X |
| 3,965,753 | 6/1976 | Browning, Jr. | 73/504 |
| 4,040,681 | 8/1977 | van der Heide | 310/90.5 |
| 4,585,282 | 4/1986 | Bosley | 310/90.5 |
| 4,642,504 | 2/1987 | Jacobson | 310/309 X |

FOREIGN PATENT DOCUMENTS

| | | | |
|---|---|---|---|
| 0393580 | 12/1973 | U.S.S.R. | 310/90.5 |
| 0694962 | 10/1979 | U.S.S.R. | 310/309 |
| 0799090 | 1/1981 | U.S.S.R. | 310/309 |

OTHER PUBLICATIONS

Epstein, L., "Electrostatic Suspension," Am. Journal of Physics, 33(5), pp. 406–407 (1965).
Nathanson, H. C. et al., "The Resonant Gate Transistor," IEEE Trans. Elect. Devices, Ed-14(3), pp. 117–133 (1967).
Woodson, H. H. et al., "Electromechanical Dynamics," Part I: Discrete Systems, pp. 192–201 (1968).
Koval, S. T. et al., "The Effect of the Rotor Pattern on The Accuracy of the Photoelectric Angle-Measuring System of a Gimballess Electrostatic Gyroscope," Optical Technology, 39 (12), pp. 730–733 (1972).
Duncan, R. R., "Micron-a Strapdown Inertial Navigator Using Miniature Electrostatic Gyros" (circa 1972–73).
Nathanson, H. C. et al., "Topologically Structured Thin Films in Semiconductor Device Operation," Physics of Thin Films, vol., B. pp. 251–333 (1975).
Petersen, K. E., "Micromechanical Light Modulator Array Fabricated on Silicon," Applied Physics Letters, vol. 31, No. 8 (Oct. 15, 1977).
Holmes, L. M., "Stability of Magnetic Levitation," Journal of Applied Physics, 49(6), pp. 3102–3109 (1978).

(List continued on next page.)

*Primary Examiner*—Mark O. Budd
*Attorney, Agent, or Firm*—Workman, Nydegger & Jensen

[57] ABSTRACT

A system and method for controlling the position and movement of an object in up to six desired degrees of freedom. The system comprises an armature which is provided with a distribution of electric charge. The armature may also include one or more magnetized regions. The system further comprises a base having components that may be actively controlled so as to cause a force to be exerted on the electric charge distribution of the armature. By appropriately controlling the components of the base, the position and movement of the armature with respect to the base can be selectively controlled.

The base may also include passive electric and/or magnetic components which assist in stabilizing the armature in one or more degrees of freedom. In addition, the base may be provided with position sensors which provide position information to control circuitry such that the position and movement of the armature with respect to the base can be controlled automatically.

37 Claims, 3 Drawing Sheets

OTHER PUBLICATIONS

Blum, J. M. et al., "Method for Making Mirror Array Light Valves," IBM Technical Disclosure Bulletin, vol. 21, No. 3 (Aug. 1978).

Peterson, K. E., "Dynamic Micromechanics on Silicon: Techniques and Devices," IEEE Trans. Elect. Devices, Ed-25(10), pp. 1241-1250 (1978).

Blanchard, R. L. "High-Accuracy Calibration of Electrostatic Gyro Strapdown Navigation Systems," J. Guidance and Control, 2(5) pp. 361-366 (1979).

McLeod, D. L., "Miniaturization of the Solid Rotor Electrostatic Gyro," IEEE, pp. 1199-1205 (1979).

Peterson, K. E., "Silicon Torsional Scanning Mirror,-"IBM J. Res. Develop., 24(5), pp. 631-637 (1980).

Jones, T. B. et al., "Electrode Geometries for Dielectrophoretic Levitation," Journal of Electrostatics, vol. 11, pp. 71-83 (1981).

Peterson, K. E., "Silicon as a Mechanical Material," Proc. IEEE, 70(5), pp. 420-457 (1982).

Lin, I. J. et al., "General Conditions for Dielectrophoretic and Magneto-hydrostatic Levitation," Journal of Electrostatics, vol. 15, pp. 53-65 (1984).

Wilson, J. T., III, "Monolithic Actuator for a Matrix Printer," IBM Technical Disclosure Bulletin, vol. 27, No. 1A, pp. 124-125 (1984).

Brooks, R. E., "Micromechanical Light Modulators on Silicon," Optical Engineering, 24(1), pp. 101-106 (1985).

Gustafsson, K. et al., "Fiberoptic Switching and Multiplexing with a Micromechanical Scanning Mirror," Transducers '87, pp. 212-215 (1987).

MICROPOSITIONER SYSTEMS AND METHODS

BACKGROUND

1. The Field of The Invention

This invention relates to actuator apparatus and methods. More particularly, this invention relates to novel micropositioner systems and methods for controlling the position and movement of an object in one or more degrees of freedom using the forces generated by electric fields.

2. The Prior Art

There is a virtually limitless number of automated apparatus in use today. Such apparatus include items as varied as construction machinery, automobiles, kitchen appliances, and wrist watches. In all of these apparatus, some type of actuator is essential.

Generally speaking, an actuator is any apparatus which is capable of causing an object to move or to otherwise change its position. A wide variety of different types of actuators are currently in use.

For example, one of the most common types of actuators is an electric motor. An electric motor may, for example, be mechanically connected by means of gears, rods, or other structures to an object whose position and/or movement one desires to control. Then, by appropriately controlling the operation of the electric motor, the object can be moved and positioned in the desired manner.

A type of electric motor which has found wide use in the field of robotics is the electric stepper motor. An electric stepper motor is a motor which is designed to move and/or rotate an object a predetermined amount whenever an electric pulse is received by the motor. Thus, after appropriately coupling the stepper motor to the object one desires to move, movement of the object can be both controlled and monitored by controlling and monitoring the number of electric pulses which are transmitted to the stepper motor.

Conventionally pneumatic and hydraulic actuators are also widely used. Such actuators typically comprise two or more telescoping cylinders. Extension and retraction of the cylinders with respect to one another is controlled by pumping air or hydraulic fluid either into or out of a reservoir adjacent the cylinders.

A pneumatic or hydraulic actuator may, for example, be connected to an arm or beam. Movement of the arm or beam can then be controlled by appropriately extending or retracting the telescoping cylinders of the actuator.

While conventional actuators such as those described above are suitable for many applications, the performance of such actuators is, in many instances, unacceptable. For example, the conventional actuators often move with an abrupt or halting action and are generally limited to movement in only one linear or rotary degree of freedom. Moreover, the use of such actuators to obtain precise movement (of order micron scale) over short distances can be extremely difficult. Such precision of movement often requires the simultaneous use of numerous actuators of different sizes and types and/or the use of complex gearing or mechanical coupling arrangements.

In addition, conventional actuators are typically quite large and bulky. Such actuators can often be several times heavier than the objects they are being used to move. The weight and size of these actuators is, thus, a significant disadvantage in those applications in which space is extremely limited or where the object being moved is very small.

Recognizing the above-outlined drawbacks of conventional actuators, those skilled in the art have made various attempts to improve the performance characteristics of such actuators. Most of these attempts have been focused at providing the actuators with improved controllers. Those skilled in the art have generally postulated that desirable performance characteristics can be approached if care is used both in selecting and designing an appropriate actuator controller and in selecting the specific electric, pneumatic and hydraulic components of the actuator.

The results of such efforts to improve actuator performance have, however, been disappointing. While some performance improvement has been achieved, the improved actuator and controller are often even larger in size and weight. The improved actuator and controller are also often extremely expensive, complex, and difficult to manufacture.

Perhaps more significantly, the performance of the improved actuators remains largely unacceptable. Such actuators are still generally limited to moving an object in only one or two degrees of freedom, and the movement caused by such actuators is often still visibly mechanical.

Recently, a number of actuator devices have been developed which use electric and/or magnetic fields to directly control the position and movement of an object. Such actuator devices have, for example, been used in various types of accelerometers and gyroscopes.

For example, one such accelerometer includes a charged sphere. The sphere is suspended by means of an electric field between at least one pair of parallel charged plates. By controlling the magnitude of the electric charge on the parallel plates, the direction and magnitude of the electric field between the plates can be varied. This, in turn, modifies the force exerted on the charged sphere. Thus, by appropriately controlling the charge on the parallel plates, the position and movement of the sphere between the plates can be controlled.

The concept of actuators which use electric and/or magnetic fields to directly control the position and movement of an object appears quite promising. In terms of speed, grace, and efficiency, their performance can far exceed that of conventional actuators. Nevertheless, such actuators which have heretofore been constructed suffer from a number of significant disadvantages.

In order to create the required electric and/or magnetic fields to position an object in space, prior art actuators typically require a complex physical structure having component parts which require careful adjustment. For example, if an object is to be suspended by an electric field, some type of structure is typically required to support two parallel plates between which the object will be positioned. If movement in more than one dimension is desired, additional sets of parallel plates are provided, and such plates also require a suitable support structure. Significantly, the orientation of each set of plates must generally be fixed and adjusted quite carefully so that the position and movement of the object between the plates can be accurately controlled.

The physical support structure which is generally required for the prior art electric and magnetic field actuators results in such actuators being quite difficult, time consuming, and expensive to manufacture. In addition, due in part to the structural complexity of such actuators, it is difficult to make the actuators on a small scale. Thus, while the performance of the prior art electric and magnetic field actuators is an improvement over conventional actuators, such actuators are still relatively large and expensive.

BRIEF SUMMARY AND OBJECTS OF THE INVENTION

In view of the foregoing, it is a primary object of the present invention to provide an actuator system and method for controlling the position and/or movement of an object with a high degree of speed, strength, grace, and efficiency.

It is a further object of the present invention to provide an actuator system which is small and lightweight.

It is a still further object of the present invention to provide an actuator system and method which is simple in physical construction and inexpensive to manufacture.

Additionally, it is an object of the present invention to provide an actuator system and method which is capable of controlling the position and/or movement of an object in multiple degrees of freedom.

It is also an object of the present invention to provide an actuator system and method which is compatible with conventional integrated circuit technology and which can be manufactured using conventional integrated circuit techniques.

Consistent with the foregoing objects, the present invention is directed to micropositioner systems and methods which use electric and/or magnetic fields to control the position and/or movement of an object in one or more degrees of freedom. The electric and/or magnetic fields are generated by actively controlled electrical conductors, together with a combination of passive electrets, polarized regions, permanent magnets, and/or conductors, all of which are arranged on a substantially planar base. Advantageously, the base and the active conductors, as well as many of the passive elements, can be manufactured using conventional integrated circuit techniques.

The object or armature whose position and/or movement is to be controlled is provided with some distribution or arrangement of electric charge. Portions of the armature may also be formed of or provided with a magnetic material. By appropriately arranging the passive elements on the base and by then varying the voltage level on the active conductors on the base, the position and/or movement of the armature with respect to the base can be selectively controlled.

The base is also preferably provided with one or more sensors to sense the position and movement of the armature with respect to the base. The output from the sensors is then provided to a suitable control device such that the position and/or movement of the armature with respect to the base can be controlled automatically.

These and other objects and features of the present invention will become more fully apparent from the following description and appended claims, taken in conjunction with the accompanying drawings.

DETAILED DESCRIPTION OF THE PREFERRED EMBODIMENTS

It will be readily appreciated that the components of the present invention, as generally described and illustrated in the Figures herein, could be arranged and designed in a wide variety of different configurations. Thus, the following more detailed description of the presently preferred embodiments of the micropositioner systems and methods of the present invention, as represented in FIGS. 1–8, is not intended to limit the scope of the invention, as claimed, but it is merely representative of the presently preferred embodiments of the invention.

The presently preferred embodiments of the invention will be best understood by reference to the drawings, wherein like parts are designated with like numerals throughout.

1. General Discussion

The most effective known actuator is probably natural muscle tissue. Muscle is capable of moving a limb or joint with remarkable speed, strength, grace, and efficiency. With the hope of being able to imitate some of the performance characteristics of muscle, the structure and operation of muscle tissue have been studied in an effort to gain a better understanding of the reasons for muscle's superior performance.

Muscle tissue is made up of numerous muscle fibers. Each muscle fiber is, in turn, composed of a plurality of tiny, hexagonally arranged action and myosin filaments (of length scale 1 micron) which interact both electrically and chemically via protein cross-bridges (of size scale 100 angstroms) to generate actuating forces. These filaments are combined both in parallel and series to form muscle fibers having the needed force, displacement, velocity, and output impedance relationships.

Since the filaments which form muscle fiber are extremely small, these filaments are necessarily in very close proximity to one another. As a result, very large electrical forces can be generated between the filaments of muscle fiber, since the magnitude of the electrical forces between these filaments is inversely proportional to the distance separating the filaments. Such electrical forces are, in fact, many times greater in magnitude than the forces which are typically generated between the components of most prior art actuators. The large electrical forces which are present in muscle fiber are believed to be at least partially responsible for the superior speed, strength, and efficiency of muscle tissue. Obtaining substantial electrical forces is also an important object of the present invention.

In addition, the electric charge distribution in muscle fiber generates complex electric field configurations. Often, for example, there are field reversals in space (that is, the force exerted by the electric field on a charged object abruptly reverses direction at some point). Also, the electric field surrounding the muscle fiber frequently has a complex gradient (that is, the magnitude and direction of the field changes over time and space in some complex manner). Such complex electric field configurations are presently believed to be advantageous to producing the desired forces in muscle tissue. Such non-uniform fields are also an important object of the present invention.

The micropositioner systems and methods of the present invention are designed so as to be capable of imitating in some degree the above-outlined electric field characteristics of natural muscle tissue. At the same time, however, the micropositioner systems and methods do not necessarily imitate the structure of natural muscle tissue. In fact, it will be readily appreciated that the specific preferred embodiments described below differ significantly in structure from natural muscle tissue.

Figure 1:
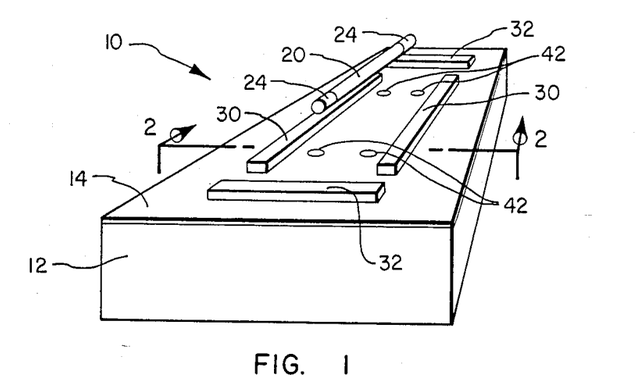
FIG. 1 is a perspective view of one presently preferred embodiment of the micropositioner system of the present invention.
Figure 2:
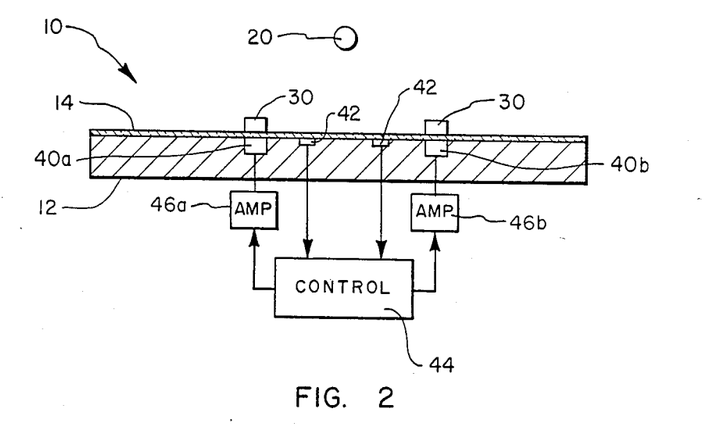
FIG. 2 is a cross-sectional view of the embodiment of FIG. 1 taken along lines 2—2 of FIG. 1 and illustrating schematically one presently preferred embodiment of the electrical control circuitry associated with the micropositioner system.

One presently preferred embodiment of the micropositioner system of the present invention, designated generally at 10, is illustrated in its entirety in FIGS. 1 and 2. As shown, micropositioner 10 comprises an armature 20 and a substantially planar base 12.

Armature 20 of micropositioner 10 is formed so as to have some distribution or arrangement of electric charge. Base 12 is provided with conductive elements 40 (see FIG. 2) which can be actively controlled so as to produce an electric field surrounding armature 20. This electric field then exerts a force on the charge distribution of armature 20 such that the position and/or movement of armature 20 with respect to base 12 can be selectively controlled in any desired number of degrees of freedom.

As will become more fully apparent from the discussion which follows, base 12 of micropositioner 10 can be manufactured using conventional integrated circuit techniques. Micropositioner 10 can thus be made quite small (of size scale 1 to 100 microns) compared with most prior art actuator devices. Significantly, as a result of this small size, electrical forces can be generated between armature 20 and base 12 which are much greater than gravitational forces.

In addition, the components of base 12 can be arranged so as to generate an electric field surrounding armature 20 which has virtually any desired configuration. Advantageously, electric fields can, therefore, be produced which are similar in some degree to the complex fields mentioned above that are associated with natural muscle filaments.

2. Micropositioner Structure

Armature 20 and base 12 of micropositioner 10 can have any of a wide variety of different configurations, as will become more fully apparent from the discussion which follows. The elementary structure and the basic relationships between the various component parts of the micropositioner system of the present invention can be best understood by reference to FIGS. 1 and 2.

As depicted in FIG. 1, armature 20 of micropositioner 10 may be configured as a substantially cylindrical rod. Armature 20 may be tethered to a substantially stationary structure in some manner. Alternatively, as shown, armature 20 may remain untethered and be free to move in any direction.

Armature 20 may be formed of any suitable material. Preferably, armature 20 is formed of a material which is a good dielectric. For example, armature 20 may be formed of a synthetic polymer or a polycarbonate material. One suitable synthetic polymer material is a synthetic resinous polymer which is currently manufactured under the trademark TEFLON by E. I. DuPont de Nemours & Co. of Wilmington, Del.

As mentioned above, armature 20 is provided with an arrangement or distribution of electric charge. Importantly, the electric charge is so distributed on armature 20 so as to enable the position and movement of armature 20 to be manipulated by an external electric field. A suitable distribution of electric charge can be provided on armature 20 in a number of different ways.

Armature 20 may, for instance, be formed of or provided with one or more electrets. The term "electret" is used herein to refer to a bounded region having a nonzero net electrical charge. Armature 20 may be provided with an electret using a variety of different methods.

For example, armature 20 can be placed in the path of some sort of electron beam. A suitable electron beam may be readily formed using a scanning electron microscope. The electron beam can be focused by the lens system of the microscope to any appropriate diameter (such as, for example, 0.1 micron), and the beam can then be guided across a portion of armature 20 by computer. Many polymer materials can be provided with electrets in this manner, and the electrons embedded in the polymer will remain relatively immobile at room temperature over a period of a number of years.

It is also possible to provide armature 20 with an electret by bringing a high voltage needle into the vicinity of armature 20. The coronal discharge from the needle to armature 20 will force electrons into armature 20 so as to form an electret.

A similar result can be obtained by placing a drop of conductive liquid on armature 20 and then subjecting the liquid to a high voltage. Under the influence of the high voltage, the conductive liquid will convey charged conductors into armature 20, thereby creating an electret.

Armature 20 may also be provided with a suitable distribution of electric charge by arranging one or more conductive regions on armature 20. Such conductive regions may, for example, be formed by means of vapor deposition or photolithography. A substantially fixed voltage level may then be provided on the conductive regions so as to produce a desired electric charge distribution.

It would, of course, be possible to prepare armature 20 in such a way that the distribution of electric charge on armature 20 could be controlled or varied. For example, if armature 20 is provided with one or more conductive regions, the voltage level on the conductive regions could be varied using conventional controls and a suitable power supply. It is, however, presently preferred that the distribution of electric charge on armature 20 be passive in nature. Thus, it is presently deemed neither desirable nor necessary to control or vary the distribution of electric charge on armature 20. By avoiding the need to control the charge distribution on armature 20, it will be appreciated that the manufacture and operation of micropositioner 10 is simplified.

A suitable distribution of electric charge on armature 20 can also be provided by forming one or more regions on armature 20 having a net electric polarization. Such a polarization can be accomplished in several ways.

For example, armature 20 may be placed in a strong electric field at an elevated temperature. At the elevated temperature, the molecules of armature 20 are quite mobile and will begin to align themselves electrically. That is, armature 20 will become polarized. When armature 20 is hereafter cooled and then removed from the electric field, the molecules of armature 20 will remain aligned so that armature 20 maintains a net electric polarization.

Alternatively, portions of armature 20 can be polarized by adsorbing certain protein molecules. Many proteins are known to have permanent electric dipoles. Armature 20 may, therefore, be brought into contact with such proteins so that said molecules are absorbed on armature 20. Portions of armature 20 will thereby become polarized.

In addition to a distribution of electric charge, armature 20 may further be provided with one or more magnetic regions. For example, if armature 20 is provided with an electret using one of the methods described above, the ends 24 of armature 20 may then be formed of or provided with a magnetic material. Suitable magnetic regions may be provided on armature 20 by vapor deposition of a 3 to 20 micron thick layer of a rare earth magnetic material, such as, for example, samarium-cobalt.

Armature 20 may, in fact, have virtually any desired combination of electric and magnetic elements. Portions of armature 20 may be provided with an electret, while other portions of armature 20 have a net electric polarization. The same armature 20 may also be provided with one or more conductive regions on which is placed a substantially fixed voltage level. Such an armature 20 may further be provided with one or more magnetic regions. The specific combination and configuration of the various electric and magnetic components on armature 20 will, of course, depend upon the particular application for which micropositioner 10 is being used and upon the specific way in which one desires to manipulate the position and movement of armature 20.

The field-generating components which are used to control the position and/or movement of armature 20 are provided on base 12 of micropositioner 10. In normal operation, base 12 and armature 20 are separated by some suitable distance, such as, for example, 50 microns. The space between base 12 and armature 20 is preferably occupied by a dielectric material, such as, for example, air.

As depicted in FIGS. 1 and 2, base 12 is configured as a substantially planar structure. Significantly, there are no separate physical structures required to support the field-generating components on base 12, as is the case with many prior art actuator devices. As a result, base 12, together with the associated field-generating components, can be constructed much more inexpensively than many of the prior art devices. In fact, as described further below, base 12 can, in many instances, be manufactured using conventional integrated circuit ("IC") techniques.

Base 12 may be formed of any of a number of different substrate materials. For example, base 12 can be formed of silicon. Alternatively, base 12 can be formed of a suitable dielectric material such as, for example, sapphire, silicon dioxide, or a synthetic polymer material.

Base 12 is provided with one or more conductive elements 40. As described further below, the voltage level on conductors 40 may be actively controlled so as to produce an electric field surrounding armature 20 which can be used to control the position and/or movement of armature 20 with respect to base 12.

Conductors 40 may be formed of any suitable conductive material, such as, for example, silicon or a polycrystalline silicon material. In such a case, conductors 40 may be formed on base 12 using conventional IC technology. Conductors 40 may, alternatively, be formed of a metal material using photolithography techniques.

Conductors 40 may have virtually any shape and may be positioned on base 12 in any desired manner. It is, however, presently preferred that conductors 40 be configured and positioned on base 12 so as to form a triad configuration in combination with armature 20. As used herein, the term "triad configuration" means a configuration wherein there are at least two elements on base 12 which have substantially the same shape as the distribution of electric charge on armature 20 and wherein armature 20, during normal operation of micropositioner 10, is positioned both between two such elements and above the surface of base 12.

Thus, for example, as illustrated in FIGS. 1 and 2, armature 20 may be configured as a substantially cylindrical rod. The distribution of electric charge on armature 20 may then extend along substantially the entire length of armature 20. In such a case, in order to form a triad configuration in combination with armature 20, conductors 40 would also be substantially elongated strips and would be positioned on base 12 so as to be substantially parallel to armature 20 and so as to lie on either side of the normal operating position of armature 20. In FIG. 1 the conductors 40 are not seen since they lie beneath stabilizing members 30, as hereinafter more fully explained.

In addition to actively controlled conductors 40, base 12 may further be provided with one or more passive stabilizing members 30 and 32 to assist in stabilizing the position of armature 20. For example, stabilizing members 30 and 32 may comprise electrets which are positioned on base 12 such that they interact with the charge distribution on armature 20 and help stabilize the position of armature 20 in one or more degrees of freedom. Alternatively, stabilizing members 30 and 32 may comprise either electrical conductors having a substantially fixed voltage level or regions having a net electric polarization. In either case, such stabilizing members 30 and 32 may be similarly positioned on base 12 so as to appropriately interact with the charge distribution on armature 20 and thereby assist in stabilizing armature 20.

As described above, armature 20 may be provided with one or more magnetic regions at ends 24. If such is the case, stabilizing members 30 and 32 may comprise permanent magnets. Stabilizing members 30 and 32 would then be positioned on base 12 so as to interact with the magnetic regions on armature 20 and assist in stabilizing the position of armature 20.

Stabilizing members 30 and 32 may be formed using the same methods that are described above in connection with providing an electric charge distribution on armature 20. Stabilizing members 30 and 32 can, using such methods, be formed as an integral part of base 12, such as, for example, by forming stabilizing members 30 and 32 of a conductive material using conventional photolithography techniques. Stabilizing members 30 and 32 may, alternatively, be formed as separate elements which are then secured to base 12 in some manner.

While stabilizing members 30 and 32 may be configured and positioned on base 12 in any suitable manner, it is presently preferred that at least some of the stabilizing members 30 and 32 be configured and positioned on base 12 so as to form a triad configuration in combination with armature 20. Thus, for example, if armature 20 is configured as a substantially cylindrical rod, as depicted in FIGS. 1 and 2, and if the electric charge distribution on armature 20 extends along substantially the entire length of armature 20, two stabilizing members 30 which are also configured as substantially elongated structures may be positioned on base 12 both so as to be essentially parallel to armature 20 and so as to lie on either side of the normal operating position of armature 20, as shown.

As shown best in FIG. 2, stabilizing members 30 may be positioned directly above conductors 40 on base 12. In such a case, it is presently preferred that some type of insulating layer 14 be provided between conductors 40 and stabilizing members 30. Insulating layer 14 may be formed of virtually any suitable material. For example, layer 14 may be formed of a synthetic polymer material. Alternatively, in order to facilitate manufacture using IC technology, insulating layer 14 may be formed of a polycarbonate or silicon dioxide material.

Advantageously, as mentioned previously, base 12 can be designed so that it can be constructed using conventional IC techniques. For example, base 12 may be formed on sapphire, and a layer of silicon crystal may be grown on the sapphire so as to be within the range of from approximately 0.6 to approximately 0.8 microns thick. Using well-known IC techniques, portions of the silicon layer may then be etched away so as to form conductors 40.

Significantly, using such IC techniques, base 12 can readily be made quite small as compared with most prior art actuator devices. Conductors 40 may, for example, be approximately two centimeters long and 192 microns wide. Adjacent conductors 40 may be separated from one another by any suitable distance, such as, for example, eight microns.

Stabilizing members 30 and 32 may also be formed using conventional IC techniques. For example, a layer 14 of silicon dioxide may be formed over the top of silicon conductors 40. Stabilizing members 30 and 32 may then be formed of a metal conductive material and provided on silicon dioxide layer 14 using conventional photolithography techniques.

As illustrated schematically in FIG. 2, conductors 40 on base 12 are connected to suitable control circuitry so as to allow for the active control of the voltage level on conductors 40. For example, conductors 40 may be connected through amplifiers 46 to a control component 44. Control 44 selectively drives an electrical current through amplifiers 46 so as to vary the voltage level of (and thereby place a surface charge upon), conductors 40.

It will be appreciated that amplifiers 46 and control 44 may be formed directly on base 12 using conventional IC techniques. Alternatively, control 44 and amplifiers 46 may be separate units which are electrically connected to conductors 40 on base 12 in some manner.

Control 44 could, of course, be manipulated manually so as to appropriately vary the voltage level on conductors 40. However, as discussed in more detail below, it will frequently be desirable to control the voltage level on conductors 40 automatically in response to the position and movement of armature 20 with respect to base 12.

In order to enable such automatic control of conductors 40, it is necessary to provide some means for detecting the position and movement of armature 20 with respect to base 12. Accordingly, as schematically depicted in FIGS. 1 and 2, a plurality of sensors 42 may be provided on base 12. The number and placement of sensors 42 on base 12 will depend upon the type and amount of information desired. As a general proposition, a greater amount of information about the position and movement of armature 20 can be obtained by increasing the number of sensors 42.

Sensors 42 may be any suitable sensor devices which are capable of detecting the position and movement of armature 20 with respect to base 12. Sensors 42 may, for example, comprise optical sensors which use light to sense the position and movement of armature 20, such as lateral effect photodiodes. Alternatively, sensors 42 may be electric or magnetic field sensors, such as, for example, Hall effect sensors, which sense the position and movement of armature 20 by sensing the fields that are produced by the electric and/or magnetic components on armature 20.

To permit the automatic control of conductors 40, control 44 may, for example, comprise a computer. Sensors 42 may provide an input to control 44, as illustrated schematically in FIG. 2. Sensors 42 will thus provide position information to control 44. Control 44 can then be programmed using conventional techniques as a proportional controller, with velocity damping, to drive amplifiers 46 so as to appropriately vary the voltage levels on conductors 40. In this way, the voltage level on each conductor 40 can be controlled and varied automatically in response to the position information received from sensors 42.

Figure 3:
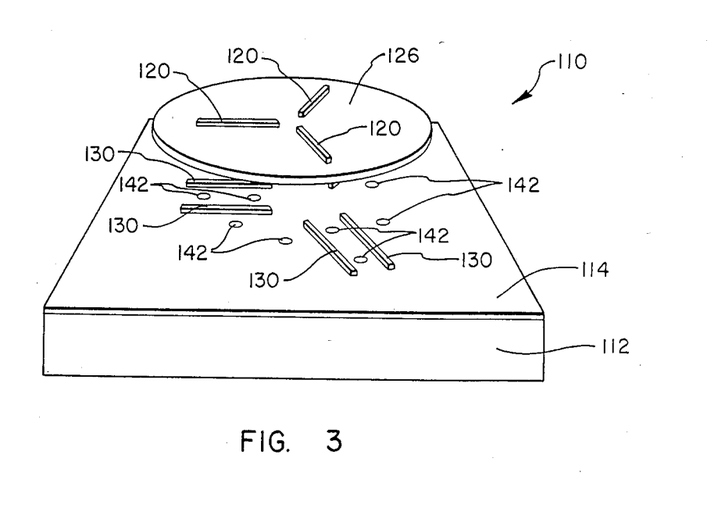
FIG. 3 is a perspective view of a second presently preferred embodiment of the micropositioner system of the present invention.

A second presently preferred embodiment of the micropositioner system of the present invention, generally designated at 110, is illustrated in FIG. 3. As with the micropositioner system 10 described above in connection with FIGS. 1 and 2, micropositioner 110 comprises an armature 126 and a base 112.

As depicted in FIG. 3, armature 126 is configured as a substantially circular disc. Armature 126 may be formed of any suitable material. Preferably, armature 126 is formed of some type of dielectric material.

In order to permit armature 126 to be controlled by an external electric field, armature 126 is provided with a plurality of radial members 120. Each radial member 120 may be formed and provided with a suitable distribution of electric charge in the manner described above in connection with armature 20, each radial member being substantially identical in form to armature 20 described above. Three substantially equally-spaced radial members 120 are illustrated in FIG. 3. However, virtually any number of radial members 120 could be provided on armature 126, and radial members 120 may be positioned on armature 126 in any desired manner.

Radial members 120 may be formed as an integral part of armature 126 using the techniques described above. Alternatively, radial members 120 may be formed separately from armature 126 using the above-described techniques and thereafter secured to the surface of armature 126 in some manner.

Base 112 of micropositioner 110 is substantially identical to base 12 of micropositioner 10, which is described above in connection with FIGS. 1 and 2. Significantly, like base 12, base 112 is a substantially planar structure on which are positioned all of the field-generating components that are used to control the position and movement of armature 126.

As shown, base 112 is provided with a plurality of stabilizing members 130. Stabilizing members 130 are substantially identical to stabilizing members 30 described above in connection with FIGS. 1 and 2. As illustrated in FIG. 3, stabilizing members 130 are preferably positioned on base 112 so as to form triad configurations in combination with radial members 120 on armature 126.

A plurality of actively controlled conductors (not shown) are also provided on base 112 under members 130. Such conductors are substantially identical to conductors 40 described above in connection with FIG. 2. Preferably, the actively controlled conductors on base 112 are also positioned so as to form triad configurations in combination with radial members 120 on armature 126. Thus, for example, an actively controlled conductor may be positioned directly beneath each of the stabilizing members 130 as illustrated in FIG. 3. In such case, stabilizing members 130 are preferably separated from the adjacent active conductors by an insulating layer 114, which is substantially identical to layer 14 described above in connection with micropositioner 10.

The three triad configurations illustrated in FIG. 3 are positioned so as to lie substantially along separate radii of a circle. When the triad configurations of a micropositioner system are positioned in this manner, the micropositioner system is denoted herein as having a "radial triad configuration."

Micropositioner 110 is also provided with appropriate control circuitry to control and vary the voltage level on the active conductors of micropositioner 110. Such control circuitry may, for example, be identical to control 44 and amplifiers 46 described above in connection with FIG. 2. Additionally, in order to enable the control circuitry of micropositioner 110 to function automatically in response to the position of armature 126, base 112 may be provided with a plurality of sensors 142 which provide position information to the control circuitry. Sensors 142 are substantially identical to sensors 42 described above in connection with FIGS. 1 and 2.

Figure 4:
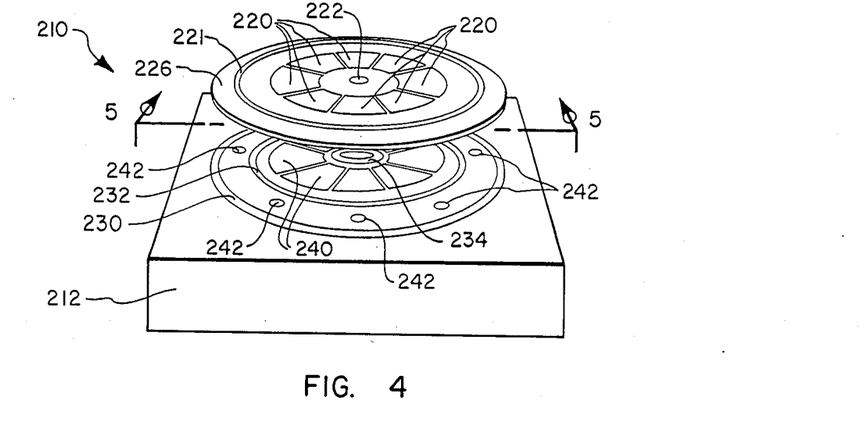
FIG. 4 is a perspective view of a third presently preferred embodiment of the micropositioner system of the present invention.
Figure 5:
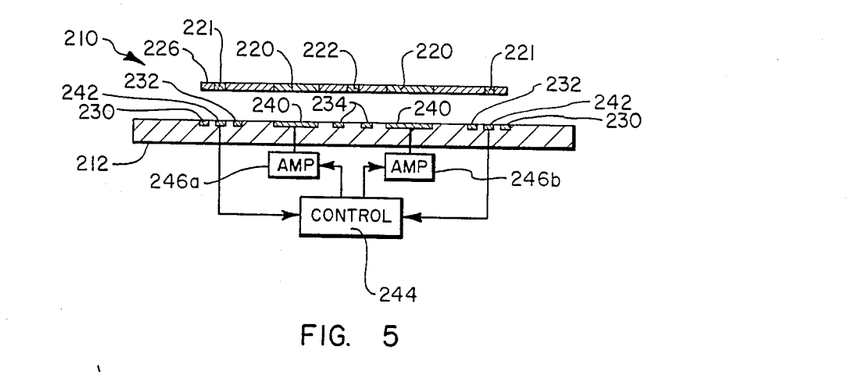
FIG. 5 is a cross-sectional view of the embodiment of FIG. 4 taken along lines 5—5 of FIG. 4 and illustrating schematically one presently preferred embodiment of the electrical control circuitry associated with the micropositioner system.

A third presently preferred embodiment of the micropositioner system of the present invention, generally designated at 210, is illustrated in FIGS. 4 and 5. Like micropositioner systems 10 and 110 described above in connection with FIGS. 1-3, micropositioner 210 also comprises an armature 226 and a base 212.

Armature 226 of micropositioner 210 is configured as a substantially circular disc and is substantially identical in construction to armature 126 described above in connection with FIG. 3. As shown, armature 226 is provided with a plurality of pad regions 220. Regions 220 are all provided with a distribution or arrangement of electric charge such that armature 226 can be controlled by an external electric field.

In addition, armature 226 is provided with a ring-shaped region 221 and a central circular region 222. Regions 221 and 222 may likewise be provided with some type of distribution of electric charge. Alternatively, regions 221 and/or 222 may comprise a magnetic material. Regions 220, 221, and 222 are substantially identical in function to armature 20 of FIGS. 1 and 2 and to radial members 120 of FIG. 3, and regions 220, 221, and 222 may be formed on armature 226 in the manner described above in connection with armature 20 and radial members 120.

Base 212 of micropositioner 210 is a substantially planar structure and is substantially identical to base 12 of FIGS. 1 and 2. Like base 12, base 212 is provided with all of the field-generating components which are used to control the position and movement of armature 226 with respect to base 212.

As depicted in FIGS. 4 and 5, base 212 is provided with passive stabilizing members 230, 232, and 234. Stabilizing members 230, 232, and 234 are substantially identical to stabilizing members 30 and 32 described above in connection with FIGS. 1 and 2. Preferably, as shown, stabilizing members 230 and 232 are configured and positioned on base 212 so as to form a triad configuration in combination with ring-shaped region 221 on armature 226.

The elements 221, 230, and 232 which form the triad configuration of micropositioner 210 are substantially parallel, concentric, circular elements. When the elements of a triad configuration are so configured, the triad configuration is referred to herein as a "circumferential triad configuration."

Base 212 is further provided with a plurality of actively controlled conductive pads 240. Pads 240 may be formed in the same manner and of the same materials as conductors 40 of FIG. 2. As shown best in FIG. 4, pads 240 preferably have substantially the same configuration and shape as passive pads 220 on armature 226.

Like micropositioners 10 and 110, micropositioner 210 is provided with some type of control circuitry to control the voltage level on conductive pads 240. Thus, as illustrated schematically in FIG. 5, pads 240 may each be connected through an amplifier 246 to a control device 244. Control 244 and amplifiers 246 are substantially identical to control 44 and amplifiers 46 of FIG. 2, respectively.

Base 212 may also be provided with a plurality of sensors 242 to sense the position and movement of armature 226. Sensors 242 are substantially identical to sensors 42 described above in connection with FIGS. 1 and 2. Sensors 242 may provide an input to control 244, as illustrated in FIG. 5, and control 244 may then control the voltage level on pads 240 automatically in response to the position of armature 226.

3. Micropositioner Operation

The operation of the micropositioner system of the present invention may be best understood by again making reference to the micropositioner system 10 illustrated in FIGS. 1 and 2.

In the operation of micropositioner 10, it is generally desirable to initially stabilize the position of armature 20 with respect to base 12. Such stabilization can be accomplished in several ways.

Armature 20 may, for example, be stabilized by continuously controlling the voltage level on conductors 40. In this way, an electric field is generated which interacts with armature 20, and the field configuration can be varied over time so as to define a position of stability for armature 20. Armature 20 may then be maintained in the established stable position as desired.

Stabilizing the position of armature 20 solely by actively controlling the voltage level on conductors 40 can, however, be quite difficult. This is especially the case if armature 20 is free to move in multiple degrees of freedom. Accordingly, it may be desirable to use a number of passive stabilizing members to assist in stabilizing armature 20.

As described above, micropositioner 10 may comprise passive stabilizing members 30 and 32. For example, armature 20 may have a substantially uniform electrical surface charge, and the ends 24 of armature 20 may be permanently magnetized. In such a case, stabilizing members 30 and 32 may, for example, comprise either electrets or permanent magnets or a combination of electrets and permanent magnets. Importantly, stabilizing members 30 and 32 establish a passive electric and/or magnetic field which interacts with armature 20 so as to help stabilize the position of armature 20 in one or more degrees of freedom.

Although stabilizing members 30 and 32 will exert a force upon armature 20 which can assist in stabilizing armature 20, Earnshaw's Law establishes that it is not possible to achieve complete stabilization of armature 20 in all degrees of freedom using only passive stabilizing components (i.e., static charge sources). Nevertheless, by properly selecting and positioning passive stabilizing members 30 and 32, it is possible to obtain stabilization of armature 20 in some degrees of freedom.

When using passive components to stabilize the position of armature 20 in one or more degrees of freedom, armature 20 may then be stabilized in the remaining degrees of freedom by properly controlling conductors 40, as outlined above. For example, the voltage level on each conductor 40 may be periodically alternated between two distinct voltage levels (such as, for example) ±150 volts). Such an alternation of voltage will generate an "alternating" electric field surrounding armature 20. Preferably, for purposes of stabilization, this "alternating" electric field should be configured so as to exert no net electric oscillatory force at the desired position of stability. Significantly, such a field, in combination with the static field generated by passive members 30 and 32, can define a position at which armature 20 is stable with respect to base 12 in all degrees of freedom.

The use of an "alternating" electric field, as explained above, is particularly advantageous in that it enables armature 20 to be stabilized in all degrees of freedom without the need to continuously monitor the position and movement of armature 20 with respect to base 12. A suitable "alternating" electric field can, for example, be generated using conventional alternating current ("AC") devices to control the voltage levels on conductors 40. By providing an appropriate source of power to the AC components, therefore, armature 20 can be maintained in a stable position with respect to base 12, without the need for any active human or mechanical monitoring, even when micropositioner 10 is not in use.

Once armature 20 has been stabilized, the voltage levels on conductors 40 may then be actively controlled and varied so as to modify the configuration of the electric field surrounding armature 20. A modification of the electric field configuration will cause a force to be exerted on armature 20 that can cause a change in the position and/or movement of armature 20. By appropriately varying and controlling the voltage levels on conductors 40 of micropositioner 10, therefore, the position and/or movement of armature 20 with respect to base 12 can be controlled.

For example, by varying the voltage level on conductor 40a with respect to the voltage level on conductor 40b, armature 20 may be moved from side-to-side. The voltage levels on conductors 40 could also be varied so as to move armature 20 either a greater or a lesser distance from base 12.

The degree of control over the position and movement of the armature of a micropositioner system will depend both on the configuration and position of the actively controlled conductors on the base of the micropositioner and on the specific configuration of the armature of the micropositioner. For example, the micropositioner 110 illustrated in FIG. 3 may be operated quite differently from the micropositioner 10 of FIGS. 1 and 2. In addition to controlling the lateral and vertical positions of armature 126 of micropositioner 110, it is also possible to rotate armature 126 about a substantially vertical axis. This may be accomplished by appropriately communicating the voltage levels on the active conductors of micropositioner 110. A similar principle is currently employed to rotate an armature in so-called "pancake" motors. Further, by controlling the magnitude of the voltage levels on such conductors, armature 126 may also be tilted from the horizontal while it is being rotated.

As mentioned above, it is possible to provide the micropositioner system of the present invention with servo controls which will control the position and/or movement of the system's armature automatically. For example, referring again to FIGS. 1 and 2, control 44 may be programmed or otherwise constructed so that it automatically adjusts the voltage levels on conductors 40 in response to position information provided by sensors 42. Control 44 could, for example, be programmed to automatically return armature 20 to a predetermined set point. Alternatively, control 44 could be programmed to continuously vary the voltage levels on conductors 40 so as to move armature 20 in some desired pattern.

Significantly, since the micropositioner system of the present invention can be constructed using IC technology so as to be extremely small (as compared with most prior art actuator devices), the armature and the base of the micropositioner system can be positioned quite close to one another (such as, for example, about 50 microns apart). The linear charge density on the armature may be about 0.10 nanocoulumbs/cm using the techniques described above, and the voltage on conductors 40 may be varied between ±150 volts. As a result, very large electrical forces on the order of $10^4$ volts/cm can be generated between the armature and the base of the micropositioner system. Additionally, since the active and passive electrical components on the base of the micropositioner system can be configured and positioned in virtually any desired manner, complex electric fields can be generated to surround the armature of the system.

It will be appreciated by those skilled in the art that certain additional factors will need to be considered in connection with designing and operating a micropositioner system in accordance with the present invention.

For example, it is not possible to construct a system which has an unlimited capacity to place an electrical charge on the actively controlled conductors. At some point, the system will become saturated, that is, the active conductors will be unable to hold any additional charge. This saturation will, of course, affect the ability of the micropositioner system to control the position and movement of the armature. Therefore, the micropositioner system should be designed so that the armature can be positioned within the desired operating range without the necessity of providing an excessive amount of electrical charge on the active conductors.

The effect of adjacent dielectrics and conductors should also be considered in designing and operating the micropositioner system. For example, the effect of a dielectric in the base of the micropositioner system is generally to impose an attractive force on the armature of the system. This is due to the introduction of local dipole moments within the material forming the base. The imposed attractive force must, of course, be counteracted. This can, for example, be accomplished either by active control of the electrical charge on the actively controlled conductors of the micropositioner system or by the use of suitable passive stabilizing members on the system's base.

4. Exemplary Applications

The exemplary applications set forth below illustrate some of the ways in which the novel micropositioner systems and methods of the present invention can be used in practice. Those of ordinary skill in the art will readily appreciate that the number of specific applications of the micropositioner systems and methods of the present invention is virtually limitless. Thus, the following exemplary applications are given by way of illustration only and are not intended to be exhaustive.

The micropositioner 10 illustrated in FIGS. 1 and 2 may, for example, be used as a directionally sensitive accelerometer. In such case, passive stabilizing members 30 and 32, together with active conductors 40, may be configured and controlled so as to fix and maintain the position of armature 20 with respect to base 12 in all degrees of freedom except along the longitudinal axis of armature 20. An additional actively-controlled conductor (not shown) may then be provided directly beneath each stabilizing member 32 in order to control the movement of armature 20 along its longitudinal axis.

When base 12 of micropositioner 10 thereafter experiences an acceleration in a direction parallel to the longitudinal axis of armature 20, armature 20 will be displaced along its longitudinal axis with respect to base 12. Such movement of armature 20 may be sensed by sensors 42, and the voltage levels on the active conductors positioned beneath stabilizing members 32 may then be controlled so as to return armature 20 to a desired set point. The energy which is required to return armature 20 to the set point can then be used as an indication of the acceleration of base 12 in directions which are parallel to the longitudinal axis of armature 20.

In a similar manner, the micropositioner 110 of FIG. 3 and the micropositioner 210 of FIGS. 4 and 5 could also be used as accelerometers. The passive and active components of micropositioners 110 and 210 could, for example, be used to stabilize the position of armatures 126 and 226, respectively. Acceleration of bases 112 and 212 would result in a displacement of armatures 126 and 226 with respect to their respective bases.

The movement of armatures 126 and 226 could be sensed by sensors 142 and 242, respectively, and the active components of micropositioners 110 and 210 could then be controlled so as to return the armatures to a desired set point. The energy which is required to return armatures 126 and 226 to the desired set point could be used as an indication of the acceleration of the respective bases 112 and 212.

In addition, by appropriately commutating the voltage levels on the active conductors of micropositioners 110 and 210, such micropositioners could also function as gyroscopes. For example, the voltage levels on pads 240 of micropositioner 210 could be commutated so as to cause armature 226 to rotate about a substantially vertical axis. Sensors 242 could then be used to detect any tilting of armature 226 with respect to base 212. Advantageously, armature 226 would be able to rotate with virtually no interference from frictional forces.

Micropositioners 110 and 210 could further be used to direct a beam of light (i.e., spacial light modulation). For example, a portion of armatures 126 and 226 could be formed of or provided with a material which is reflective of light, such as, for example, by vapor deposition. A beam of light could then be directed at the reflective material, and armatures 126 and 226 could be positioned so as to reflect and thereby direct the beam of light in some desired manner. Optionally, by directing a beam of light toward some type of target, such as, for example, a luminescent screen, the position and movement of armatures 126 and 226 could be controlled so as to create a desired optical display.

Figure 6:
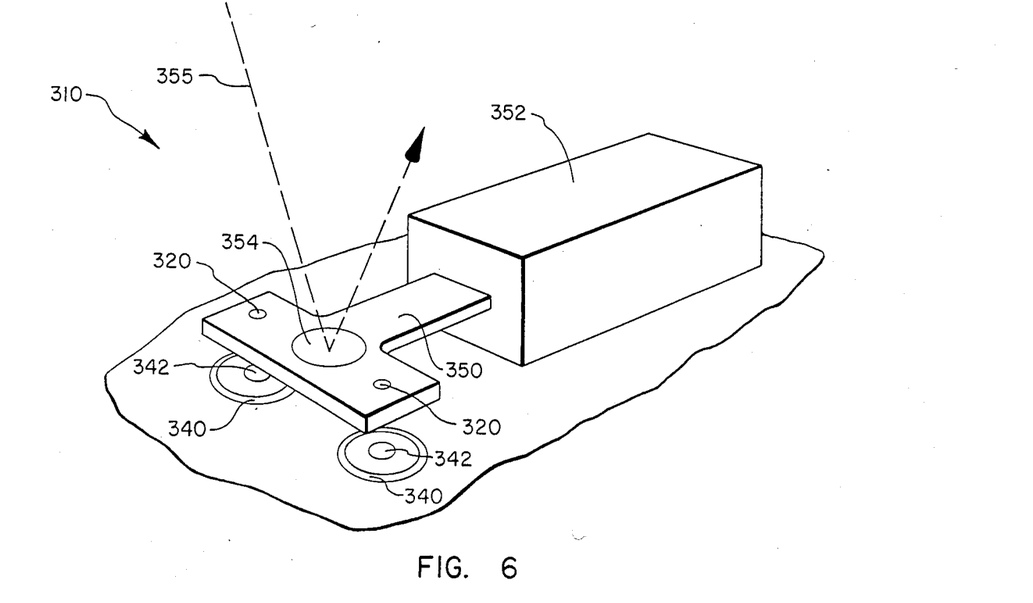
FIG. 6 is a perspective view of a micropositioner system within the scope of the present invention wherein the armature of the system is tethered and wherein a portion of the armature is reflective of light.

Another micropositioner device, generally designated at 310, that may be used to direct a beam of light is illustrated in FIG. 6. As shown, micropositioner 310 comprises an armature 350 which is provided with a reflective region 354. Armature 350 may be formed of the same materials as those described above in connection with armature 20 of FIGS. 1 and 2.

Armature 350 is tethered in some manner to some type of support member 352. Armature 350 may, for example, be suitably tethered using a conventional fiber optic chuck or another similar device. Thus, armature 350 is free to move in only certain limited degrees of freedom. For example, armature 350 of FIG. 6 may be limited to tilting either upward or downward.

Armature 350 is also provided with two regions 320 that have some distribution or arrangement of electric charge. Regions 320 may be formed and provided on armature 350 in the manner described above in connection with regions 120 of FIG. 3 and armature 20 of FIGS. 1 and 2.

A sensor 342 is provided directly beneath each region 320 on armature 350 to detect the position and movement of armature 350. Each sensor 342 is surrounded by a conductive ring 340. A voltage may be placed on rings 340 so as to generate an electric field surrounding armature 350 that interacts with regions 320. Sensors 342 and rings 340 are substantially identical to sensors 42 and conductors 40, respectively, which are described above in connection with FIGS. 1 and 2. Sensors 342 and rings 340 may also be connected to and controlled with the same type of control circuitry as that illustrated and described above in connection with FIG. 2.

By appropriately controlling the voltage levels on rings 340, the position and movement of armature 350 may be actively controlled. As a result, a beam of light, schematically illustrated at 355, may be directed at reflective region 354, and movement of armature 350 can then cause beam 355 to be reflected and directed in some desired manner. Micropositioner 310 may thus be used to produce some kind of visual display by directing a beam of light onto a suitable surface. For example, a beam of light may be directed onto a luminescent screen so as to produce a seemingly continuous display similar to those currently produced by cathode ray tubes.

Figure 7:
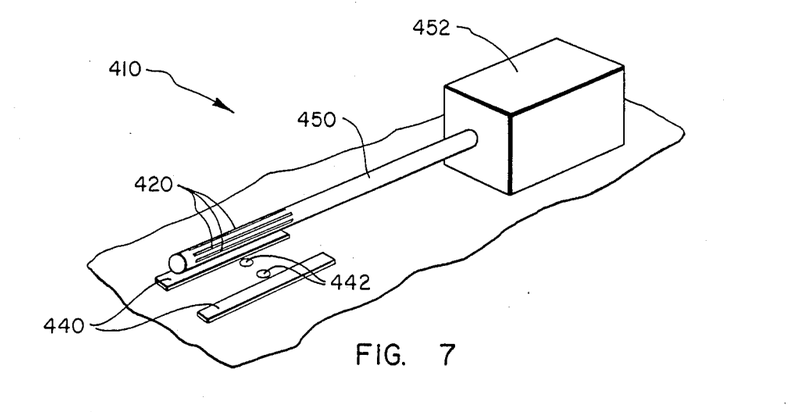
FIG. 7 is a perspective view of a micropositioner system within the scope of the present invention wherein the armature of the system comprises an optical fiber.
Figure 8:
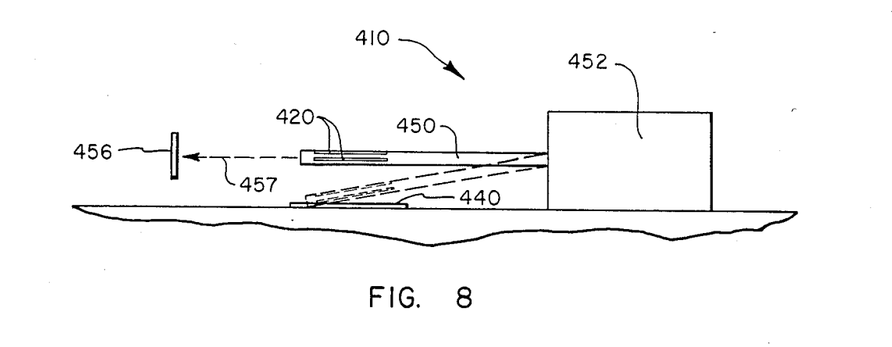
FIG. 8 is a side elevation view of the embodiment of FIG. 7 illustrating the use of the micropositioner system as a memory device, one memory state being depicted in solid lines and a second memory state being depicted in broken lines.

FIGS. 7 and 8 illustrate yet another application of the micropositioner system of the present invention. Micropositioner 410 depicted in FIGS. 7 and 8 comprises an optical fiber 450 which is capable of conducting a column of light. Fiber 450 may have any suitable length and diameter, such as, for example, a length of about 5 cm and a diameter of 140 microns. Fiber 450 is tethered at one end to a support member 452, such as, for example in a fiber optic chuck.

Adjacent the opposite end of fiber 450, one or more regions 420 are provided which have some distribution or arrangement of electric charge. Regions 420 may be formed and provided on fiber 450 in the manner described above in connection with regions 120 of FIG. 3 and armature 20 of FIGS. 1 and 2. For example, a 1.5 cm long region towards the distal end of fiber 450 may be coated with a 3 to 4 micro thick layer of a charge retentine polymeric material such as TEFLON. Fiber 450 is then irradiated in a SEM at about 30 keV to yield a linear charge density of approximately 0.10 nanocoulomb/cm.

Directly beneath fiber 450 are two conductors 440 which may be actively controlled in the manner described above so as to control the position and movement of fiber 450. Sensors 442 are also provided to detect the position and movement of fiber 450. Conductors 440 and sensors 442 are substantially identical in size and construction to conductors 40 and sensors 42 of FIGS. 1 and 2, and conductors 440 and sensors 442 may likewise be connected to and controlled with the same type of control circuitry as that illustrated in FIG. 2.

As depicted in FIG. 8, a light-sensitive material 456 may be provided adjacent the end of optical fiber 450. A beam of light emerging from fiber 450, illustrated schematically at 457, may then be directed at light-sensitive material 456 to produce some desired output.

Device 410 could, for example, be used to provide a visual display. In such case, light-sensitive material 456 may be a luminescent screen. Light beam 457 could be directed toward screen 456 and so as to provide a seemingly continuous visual display which is similar to the display produced by a cathode ray tube.

Alternatively, light-sensitive material 456 may be a lateral effect photo diode (a device which can sense the position of a light beam upon its surface). Micropositioner 410 may then be operated as an accelerometer, with movement of fiber 450 being detected by diode 456. As explained previously in connection with the micropositioners of FIGS. 1–5, the energy required to maintain fiber 450 at a desired set point can be determined and will provide an indication of acceleration. Using a 5 milliwatt laser source of light through fiber 450, a roughly 2500 micron spot is projected onto diode 456. Diode 456 will respond to the centroid of this spot with about one micron resolution.

Micropositioner 410 could also function as a digital memory device. For example, when beam 457 is directed at light-sensitive member 456, such a condition could indicate a first memory state. A second memory state could be indicated when beam 457 is not directed at light-sensitive member 456, as shown, for example, in the broken lines in FIG. 8. It will thus be readily appreciated that micropositioner 410 could be digitally operated and could be used to provide a desired digital output.

Micropositioner 410 could be configured so as to have virtually any number of different memory states. For example, micropositioner 410 could be provided with multiple different light-sensitive members 456, each representing a different memory state. Light beam 457 from fiber 450 could then be selectively directed toward any of the members 456 to produce a desired memory output.

Optionally, micropositioner 410 could include suitable passive stabilizing members (not shown) which define one or more stable states or positions for fiber 450. Conductors 440 could then be used to move fiber 450 between the various stable states. Advantageously, by appropriately configuring the passive stabilizing members with respect to fiber 450, fiber 450 could be "latched" into one of such stable positions even when conductors 440 are not being actively controlled.

5. Summary

From the foregoing, it will be appreciated that the present invention provides an actuator system and method which is compatible with conventional integrated circuit technology and which can be manufactured using conventional integrated circuit techniques. Significantly, using such techniques, the actuator system of the present invention can be constructed on a very small size scale as compared with most prior art actuators.

As described above, all of the active components of the actuator system and method of the present invention lie on a substantially planar base structure. Consequently, no cumbersome, separate support structures are required to support the various components of the actuator system. The present invention thus provides an actuator system and method which is simple in physical construction and inexpensive to manufacture.

In addition, as illustrated by the various examples herein, the actuator system of the present invention is quite versatile. Also, the position and movement of the armatures of the micropositioner systems of the present invention can be controlled in up to six spacial degrees of freedom. The present invention therefore provides an actuator system and method which is free from many of the limitations and disadvantages of the prior art actuator devices.

Importantly, because the micropositioner systems of the present invention can be made very small, the electric forces between the armature and the base of a system can be quite large. The armature of such a micropositioner system is also capable of being moved quickly, smoothly, and precisely from one position to another. In addition, the micropositioner systems of the present invention are virtually free from interference by stictional forces.

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A system for controlling the position and movement of an object, at least a portion of which is comprised of either a bounded region having a non-zero net electrical charge, or a bounded region having a non-zero net electric polarization, said system comprising:
   a substantially planar base member having an upper surface;
   first and second field-producing elements formed on the upper surface of said base member, said elements having a shape that is substantially the same as the bounded region of said object, and said elements being positioned on said base member such that the bounded region of said objects is both between said elements and above the upper surface of said base member; and
   means for producing at said elements an electric field that is selectively variable as to its field strength, whereby the position and movement of said object can be selectively controlled both between and above said elements.

2. A system as defined in claim 1 wherein said bounded region comprises an electret having a substantially constant, non-zero net electrical charge.

3. A system as defined in claim 1 wherein said bounded region comprises an electrical conductor having a substantially fixed voltage level.

4. A system as defined in claim 1 wherein the field-producing elements each comprise an electrical conductor.

5. A system as defined in claim 1 further comprising means, formed on the upper surface of said base member, for stabilizing the position of the object in at least one degree of freedom.

6. A system as defined in claim 1 further comprising means, formed on the upper surface of said base member, for sensing the position and movement of the object.

7. A system for controlling the position and movement of an object, at least a portion of which is comprised of either a bounded region having a non-zero net electrical charge, or a bounded region having a non-zero net electrical polarization, said system comprising:
   a substantially planar base member having an upper surface;
   first and second field-producing elements formed on the upper surface of said base member, said elements having a shape that is substantially the same as the bounded region of said object, and said elements being positioned on said base member such that the bounded region of said object is both between said elements and above the upper surface of said base member;
   stabilizing means, formed on the upper surface of said base member, for producing a field which acts on the bounded region of said object so as to stabilize said object between and above said elements in at least one degree of freedom; and
   means for producing at said elements an electric field that is selectively variable as to its field strength, whereby the position and movement of said object can be selectively controlled both between and above said elements.

8. A positioner system as defined in claim 7 wherein said bounded region comprises an electret having a substantially constant, non-zero net electrical charge.

9. A positioner system as defined in claim 7 wherein said bounded region comprises an electrical conductor having a substantially fixed voltage level.

10. A positioner system as defined in claim 7 wherein said object is tethered to a support member which remains substantially stationary with respect to the base member so as to limit movement of the object in one degree of freedom.

11. A positioner system as defined in claim 7 wherein said object comprises an armature configured as a substantially circular disc.

12. A positioner system as defined in claim 7 wherein at least a portion of the object is reflective of light.

13. A positioner system as defined in claim 7 further comprising a dielectric material interposed between the object and the base member.

14. A positioner system as defined in claim 13 wherein the object and the base member are separated by a distance of approximately 50 microns.

15. A positioner system as defined in claim 7 wherein the field-producing elements of the base member each comprise an electrical conductor.

16. A positioner system as defined in claim 18 wherein the base member comprises a sapphire substrate.

17. A positioner system as defined in claim 16 wherein each conductor is formed of a silicon material which is grown on the sapphire substrate.

18. A positioner system as defined in claim 17 wherein each conductor is approximately 2 centimeters long, approximately 192 microns wide, and within the range of from approximately 0.6 to 0.8 microns thick.

19. A positioner system as defined in claim 18 wherein the conductors are separated from one another by a distance of approximately 8 microns.

20. A positioner system as defined in claim 7 wherein a plurality of objects are radially positioned on a circular disc, and wherein said system is further comprised of a pair of said elements radially positioned on said base member such that the bounded region of said object is both between one pair of said elements and above the upper surface of said base member.

21. A positioner system as defined in claim 7 wherein the bounded region of said object is a circular ring, and wherein said elements each are shaped as circular rings.

22. A positioner system as defined in claim 7 wherein the stabilizing means of the base member comprises a bounded region having a non-zero net electrical charge.

23. A positioner system as defined in claim 22 wherein the bounded region of said stabilizing means comprises an electret having a substantially constant, non-zero net electrical charge.

24. A positioner system as defined in claim 22 wherein the bounded region of said stabilizing means comprises an electrical conductor having a substantially fixed voltage level.

25. A positioner system as defined in claim 7 wherein the stabilizing means of the base member comprises a bounded region having a non-zero net electric polarization.

26. A positioner system as defined in claim 7 wherein at least a portion of the object is magnetized and wherein the stabilizing means of the base member comprises a bounded magnetized region.

27. A positioner system as defined in claim 7 wherein the stabilizing means of the base member has substantially the same configuration as the field-producing elements of the base member, and wherein the stabilizing means and the field-producing means are positioned on top of one another, and further comprising a layer of insulating material separating the stabilizing means and the field-producing means.

28. A positioner system as defined in claim 7 further comprising means, formed on the upper surface of the base member, for sensing the position and movement of the.

29. A system for controlling the position and movement of an object, at least a portion of which is comprised of either a bounded region having a non-zero net electrical charge, or a bounded region having a non-zero net electrical polarization, said system comprising:
  a substantially planar base member having an upper surface;
  first and second field-producing elements formed on the upper surface of said base member, said elements having a shape that is substantially the same as the bounded region of said object, and said elements being positioned on said base member such that the bounded region of said object is both between said elements and above the upper surface of said base member;
  means, formed on the upper surface of said base member, for sensing position and movement of said object relative to said base member; and
  means, responsive to said sensing means, for producing at said elements an electric field that is selectively variable as to its field strength, whereby the position and movement of said object can be selectively controlled both between and above said elements.

30. A positioner system as defined in claim 29 wherein at least a portion of the object is reflective of light.

31. A positioner system as defined in claim 29 wherein the object is tethered to a support member which remains substantially stationary with respect to the base member so as to limit movement of the object in one degree of freedom.

32. A positioner system as defined in claim 29 wherein the object comprises an optical fiber.

33. A positioner system as defined in claim 32 wherein the optical fiber has a diameter of approximately 140 microns.

34. A positioner system as defined in claim 32 further comprising a light sensitive member adjacent an end of the optical fiber.

35. A positioner system as defined in claim 34 wherein the light sensitive member comprises a luminescent material.

36. A positioner system as defined in claim 34 wherein the light sensitive member comprises a lateral effect photodiode.

37. A positioner system as defined in claim 29 wherein the base member further comprises means, formed on the upper surface of said base member, for stabilizing the position of the object in at least one degree of freedom.

* * * * *

UNITED STATES PATENT AND TRADEMARK OFFICE
CERTIFICATE OF CORRECTION

PATENT NO. : 4,789,803

DATED : December 6, 1988

INVENTOR(S) : Stephen C. Jacobsen, et al.

It is certified that error appears in the above-identified patent and that said Letters Patent is hereby corrected as shown below:

Column 20, line 20, "as defined in claim 18" should be --as defined in claim 15--

Column 21, lines 5-6, "movement of the." should be --movement of the object.--

Signed and Sealed this

Twenty-fifth Day of July, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,789,803

DATED : December 6, 1988

INVENTOR(S) : Stephen C. Jacobsen, et al.

It is certified that error appears in the above-identified patent and that said Letters Patent is hereby corrected as shown below:

Title page, column 1, where Assignee is listed, "Sarcos, Inc." Should be --Sarcos Group, a limited partnership--

Signed and Sealed this

Eighth Day of December, 1992

Attest:

DOUGLAS B. COMER

*Attesting Officer*    Acting Commissioner of Patents and Trademarks